US009152818B1

(12) United States Patent
Hathaway et al.

(10) Patent No.: US 9,152,818 B1
(45) Date of Patent: Oct. 6, 2015

(54) MANAGING AUTHENTICATION BASED ON CONTACTING A CONSUMER AS SOON AS THE CONSUMER HAS PERFORMED AN AUTHENTICATION OPERATION

(75) Inventors: Matthew R. Hathaway, Newtown, MA (US); Bryan Knauss, Broadlands, VA (US)

(73) Assignee: EMC Corporation, Hopkinton, MA (US)

( * ) Notice: Subject to any disclaimer, the term of this patent is extended or adjusted under 35 U.S.C. 154(b) by 104 days.

(21) Appl. No.: 13/339,585

(22) Filed: Dec. 29, 2011

(51) Int. Cl.
*G06F 9/00* (2006.01)
*G06F 21/62* (2013.01)
*H04L 29/06* (2006.01)

(52) U.S. Cl.
CPC .......... *G06F 21/6245* (2013.01); *H04L 63/101* (2013.01)

(58) Field of Classification Search
CPC .. H04L 9/3271; H04L 63/101; G06F 21/6245
USPC ............................................................ 726/5
See application file for complete search history.

(56) References Cited

U.S. PATENT DOCUMENTS

| 7,676,433 | B1 | 3/2010 | Ross et al. | |
| 7,739,733 | B2 | 6/2010 | Szydlo | |
| 2003/0097485 | A1* | 5/2003 | Horvitz et al. | 709/313 |
| 2003/0195859 | A1* | 10/2003 | Lawrence | 705/75 |
| 2004/0143546 | A1* | 7/2004 | Wood et al. | 705/40 |
| 2006/0271457 | A1* | 11/2006 | Romain et al. | 705/35 |
| 2007/0043577 | A1* | 2/2007 | Kasower | 705/1 |
| 2008/0033845 | A1* | 2/2008 | McBride et al. | 705/28 |
| 2008/0288299 | A1* | 11/2008 | Schultz | 705/4 |
| 2009/0106846 | A1* | 4/2009 | Dupray et al. | 726/26 |
| 2009/0222897 | A1* | 9/2009 | Carow et al. | 726/6 |
| 2009/0305667 | A1* | 12/2009 | Schultz | 455/410 |
| 2009/0305670 | A1 | 12/2009 | DeBoer et al. | |
| 2011/0131123 | A1* | 6/2011 | Griffin et al. | 705/35 |
| 2012/0191621 | A1* | 7/2012 | Williams et al. | 705/325 |
| 2012/0310702 | A1 | 12/2012 | Paulsen et al. | |

* cited by examiner

*Primary Examiner* — Hadi Armouche
*Assistant Examiner* — Bryan Wright
(74) *Attorney, Agent, or Firm* — BainwoodHuang

(57) ABSTRACT

A technique manages consumer authentication. The technique involves communicating with an institutional entity to perform an authentication operation regarding a consumer. The technique further involves conveying a query to the consumer in response to the authentication operation. The query prompts the consumer to indicate whether the consumer participated in the authentication operation. The technique further involves obtaining a response to the query indicating whether the consumer participated in the authentication operation. The authentication operation is legitimate when the response indicates that the consumer participated in the authentication operation. The authentication operation is fraudulent when the response indicates that the consumer did not participate in the authentication operation. In some arrangements, the authentication operation involves knowledge-based authentication (KBA) activity. In some arrangements, the query is conveyed to the consumer through an identity protection entity which is different than the institutional entity.

27 Claims, 5 Drawing Sheets

MANAGING AUTHENTICATION BASED ON CONTACTING A CONSUMER AS SOON AS THE CONSUMER HAS PERFORMED AN AUTHENTICATION OPERATION

BACKGROUND

In knowledge-based authentication (KBA), an organization questions someone for particular personal information. Such questions may include "where were you married?", "what was the color of your first car?", and "what was the name of your first pet?". The person must answer the question correctly in order to prove to the organization that he or she is not an imposter.

In some situations, the person provides the organization with the answers to such questions up front (e.g., when opening an account with the organization). The organization is then able to save the answers, and re-ask one or more of the questions to authenticate the person at a later time.

In other situations, the organization may work with a KBA service provider. In these situations, when the organization wishes to authenticate a person, the organization identifies who the person claims to be to the KBA service provider. The KBA service provider then retrieves previously gathered data on the person from one or more information sources (e.g., credit agencies, public records, commercially available information regulated by the Gramm, Leach, Bliley Act, etc.) and provides, to the organization, an appropriate set of questions based on that gathered data. Next, the organization asks the person one or more of the questions and relays each answer back to the KBA service provider. The KBA service provider then evaluates each provided answer and provides the organization with an authentication result (e.g., "passed authentication" or "failed authentication").

SUMMARY

Unfortunately, the above-described conventional situations assume that fraudsters do not have access to personal information regarding a person undergoing authentication. However, a great amount of that personal information may be widely known by that person's family, friends, co-workers, and so on. If a fraudster knows this information or is able to obtain such information, the fraudster will be able to successfully pass knowledge-based authentication.

To protect against such fraudsters, identity theft protection companies offer services which alert subscribers when the identity theft protection companies discover sharing of their subscribers' personal information. For example, when an identity theft protection company discovers illegal selling of a subscriber's personal information, the identity theft protection company may send an email message or call that subscriber. Unfortunately, by the time the subscriber's personal information is offered for sale, a significant amount of time may have passed since the subscriber's identity was stolen and used by a fraudster.

An improved technique involves contacting a consumer (i.e., a human) as soon as a KBA service provider has communicated with an institutional entity to perform an authentication operation regarding the consumer (e.g., to open a credit card account, to open a line of credit at a store, etc.). Once the consumer is contacted (i.e., via a subscribed notification service), the consumer can confirm that the consumer did in fact participate in the authentication operation. Moreover, once the consumer is contacted, if the consumer indicates that the consumer did not participate in the authentication operation, the consumer now knows that the consumer's identity has been stolen and appropriate steps can be taken to protect the consumer before more time passes.

One embodiment is directed to a method of managing consumer authentication. The method includes communicating with an institutional entity to perform an authentication operation regarding a consumer. The method further includes conveying a query to the consumer in response to the authentication operation. The query prompts the consumer to indicate whether the consumer participated in the authentication operation. The method further includes obtaining a response to the query indicating whether the consumer participated in the authentication operation. The authentication operation is legitimate when the response indicates that the consumer participated in the authentication operation. The authentication operation is fraudulent when the response indicates that the consumer did not participate in the authentication operation.

In some arrangements, the authentication operation involves knowledge-based authentication (e.g., asking the consumer to provide specific personal information that the consumer should know). Along these lines, a banking institution could obtain a set of KBA questions from an identity verification platform (e.g., via a web server of a KBA service provider) in order to authenticate a new bank customer when the new bank customer opens up a credit account. Other situations are suitable for use as well.

In some arrangements, the query which prompts the consumer to indicate whether the consumer participated in the authentication operation is conveyed to the consumer through an identity protection entity which is different than the institutional entity. Such out-of-band querying of the consumer may be provided by the identity protection entity in the form of a subscribed notification service (e.g., the consumer may subscribe to such a service provided by an identity theft protection company).

Other embodiments are directed to systems, apparatus, processing circuits, computer program products, and so on. Some embodiments are directed to various procedures, electronic components and circuitry which are involved in managing consumer authentication and providing such a notification service.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved techniques involve contacting a consumer (i.e., a human) as soon as a knowledge-based authentication (KBA)

service provider has communicated with an institutional entity to perform an authentication operation regarding the consumer. Once the consumer is contacted, the consumer can confirm that the consumer did in fact participate in the authentication operation. Moreover, once the consumer is contacted, if the consumer indicates that the consumer did not participate in the authentication operation, the consumer now knows that the consumer's identity has been stolen and appropriate steps can be taken to protect the consumer before more time passes.

Figure 1:
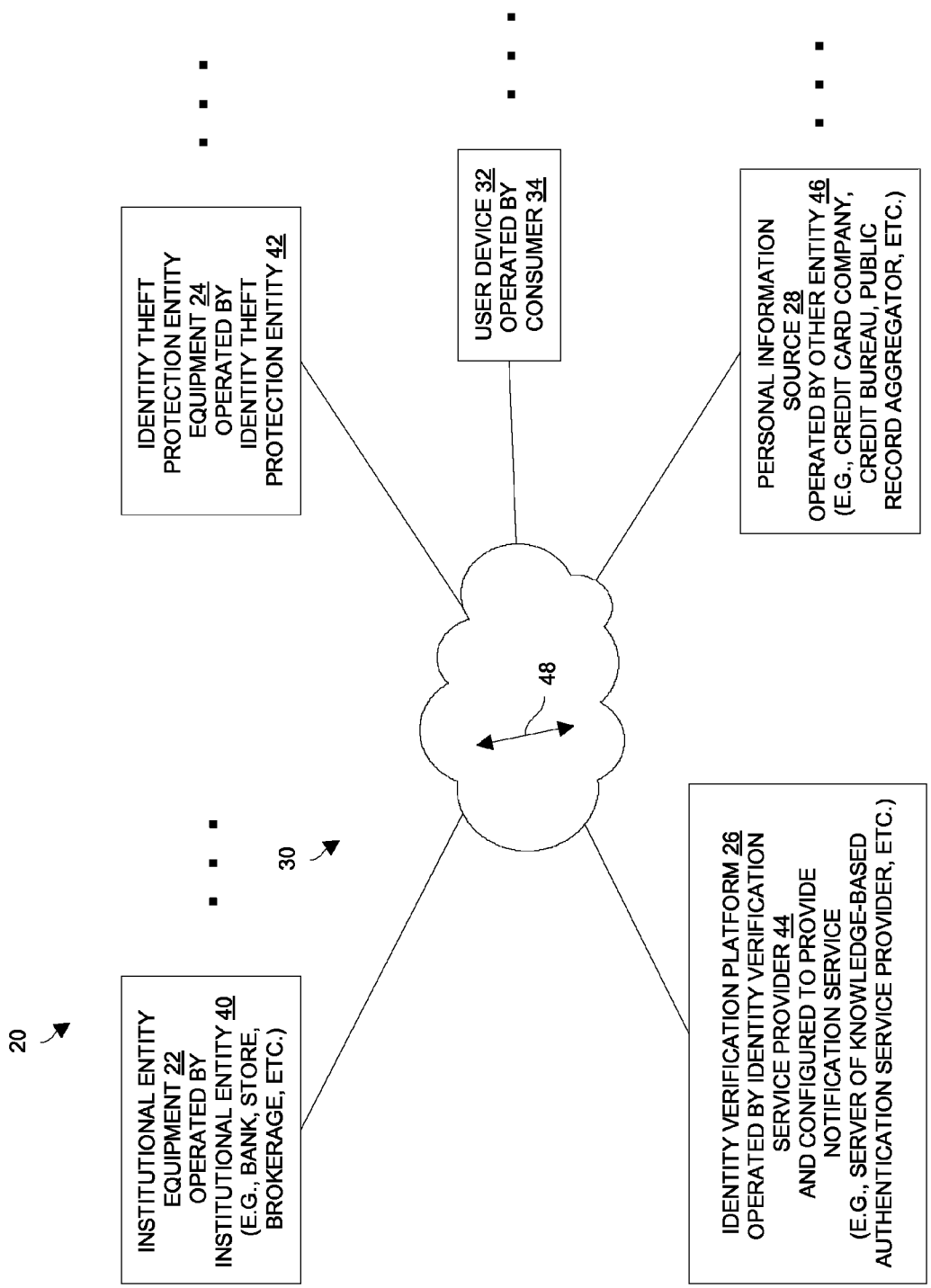
FIG. 1 is a block diagram of an electronic system which manages consumer authentication in accordance with the improved technique.

FIG. 1 shows an electronic environment 20 which manages consumer authentication in accordance with the improved techniques. The electronic environment 20 includes institutional entity equipment 22, identity theft protection entity equipment 24, an identity verification platform 26, a personal information source 28, and a communications medium 30. The electronic system 20 may further include additional devices such as a user device 32 operated by a consumer 34, and so on.

The institutional entity equipment 22 is operated by an institutional entity 40 and is constructed and arranged to conduct business with consumers 34 (i.e., people). The institutional entity equipment 22 may include servers, client devices, etc. which are under control of the institutional entity 40. Examples of suitable institutional entities 40 include credit card companies, banking institutions, retail stores, brokerage institutions, and so on.

The identity theft protection entity equipment 24 is operated by an identity theft protection entity 42. The identity theft protection entity equipment 24 may include servers, client devices, etc. under control of the identity theft protection entity 42. Such an entity is typically in the business of offering identity theft protection services to subscribers (e.g., monitoring for un-authorized uses of subscriber identities, monitoring for black-market sales of subscriber identities, etc.).

The identity verification platform 26 is operated by an identity verification service provider 44. Such a service provider offers KBA services to the institutional entity 40. Along these lines, the identity verification service provider 44 provides sets of KBA questions to the institutional entity 40 to enable the institutional entity 40 to perform KBA operations with consumers 34. Additionally, the identity verification service provider 44 offers notification services to the identity theft protection entity 42 to notify the identity theft protection entity 42 when a particular consumer 34, who is also a subscriber of the identity theft protection entity 42, has participated in a KBA operation with the institutional entity 40.

The personal information source 28 provides the identity verification platform 26 with access to specific personal information of consumers 34. Examples of suitable personal information sources 28 include credit card companies, credit bureaus, public registries and databases, and so on. Typically, the personal information source 28 is operated by an entity 46 which is separate from the institutional entity 40 and the identity theft protection entity 42.

The communications medium 30 connects the various components of the electronic environment 20 together to operate as a system and to enable these components to exchange electronic signals 48 (e.g., see the double arrow 48). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc.

The user device 32 represents an electronic apparatus which is operated by a consumer 34. Examples of suitable electronic apparatus include a general purpose computer, a laptop or notebook computer, a tablet or hand held apparatus, a smart phone, a traditional telephone, and so on. For another component of the electronic system 20 to communicate with the consumer 34, that component may connect to the user device 32 of the consumer 34 through the communications medium 30.

During operation, the consumer 34 subscribes to an identity theft protection service of the identity theft protection entity 42. As part of this service, the identity theft protection entity 42 indicates that, as part of an identity theft protection package purchased by the consumer 34, it will notify the consumer 34 if the identity theft protection entity 42 becomes aware of any authentication operations regarding the consumer 34. The identity theft protection entity equipment 24 then communicates with the identity verification platform 26 to inform the identity verification platform 26 that the consumer 34 subscribes to the notification service. In response, the identity verification platform 26 configures itself to inform the identity theft protection entity equipment 24 if the identity verification platform 26 ever performs KBA regarding the consumer 34.

Now, suppose that the institutional entity 40 receives an application from an applicant to open a new account (e.g., a loan application at a banking institution). As part of an authentication operation of the application process, the institutional entity equipment 22 communicates with the identity verification platform 26 to obtain a set of KBA questions to ask the applicant. In this situation, suppose that the applicant identifies himself or herself as the consumer 34 (who had subscribed to the identity theft protection service). The identity verification platform 26 retrieves information regarding the consumer 34 from the personal information source 28 in order to prepare an appropriate set of KBA questions for use by the institutional entity 40 in a KBA session. Once the authentication operation is completed, the identity verification platform 26 immediately informs the identity theft protection entity equipment 24 operated by identity theft protection entity 42 that an authentication operation regarding the consumer 34 has taken place.

In response, the identity theft protection entity 42 queries the consumer 34 as to whether the consumer 34 actually participated in the authentication operation. Along these lines, the identity theft protection entity equipment 24 may contact the consumer 34 via the user device 32 (e.g., via an email message, via an SMS message, via an actual telephone call, etc.).

If the consumer 34 indicates that he or she did participate in the authentication operation (i.e., the applicant was truly the consumer 34), the identity theft protection entity equipment 24 simply informs the identity verification platform 26 of this fact. The identity verification platform 26 may then simply update its records or perhaps update its records in combination with sending a confirmation to the institutional entity 40.

However, if the consumer 34 indicates that he or she did not participate in the authentication operation (i.e., the applicant was not the consumer 34), the identity theft protection entity equipment 24 again informs the identity verification platform 26. In this case, the identity verification platform 26 immediately informs the institutional entity 40 to allow the institutional entity 40 to take remedial action (e.g., perform an investigation, freeze the new account, etc.).

It should be understood that there are multiple benefits derived from the above-described scenario. In particular, the consumer 34 benefits by immediately thwarting a potential theft of the consumer's identity. Additionally, the institutional entity 40 benefits by taking remedial action shortly after completing the authentication operation. Furthermore, the identity theft protection entity 42 benefits by offering an enriched service to its subscribers. Also, other institutional entities 40 may benefit if these entities 40 agree to share such alerts among each other (e.g., as a federation of institutional entities 40).

Along these lines, it should be further understood that the electronic environment 20 may include multiple installations of institutional entity equipment 22 operated by multiple institutional entities 40 all of which work with the identity verification platform 26 operated by the identity verification service provider 44 in order to protect against fraudulent transactions (e.g., fraudster applicants, etc.). Essentially, the identity verification platform 26 is equipped to provide the notification service and associated alerts to a federation of institutional entities 40.

Additionally, it should be understood that the electronic environment 20 may include multiple installations of identity theft protection entity equipment 24 operated by multiple identity theft protection entities 42 all of which work with the identity verification platform 26 operated by the identity verification service provider 44 in order to provide an enhanced set of identity monitoring services to their subscribers.

Furthermore, it should be understood that the electronic environment 20 may include multiple personal information sources 28. One will appreciate that personal information which initially may have been known by only a few may proliferate and become more publicly accessible over time. Accordingly, broadening the personal information sources will continue to provide new data for KBA.

Also, it should be understood that the electronic environment 20 may include multiple user devices 32 operated by multiple consumers 34. Along these lines, the consumers 34 may become subscribers of one or more identity theft protection entities 42, as well as deal with one or more institutional entities 40. Further details will now be provided with reference to FIG. 2.

Figure 2:
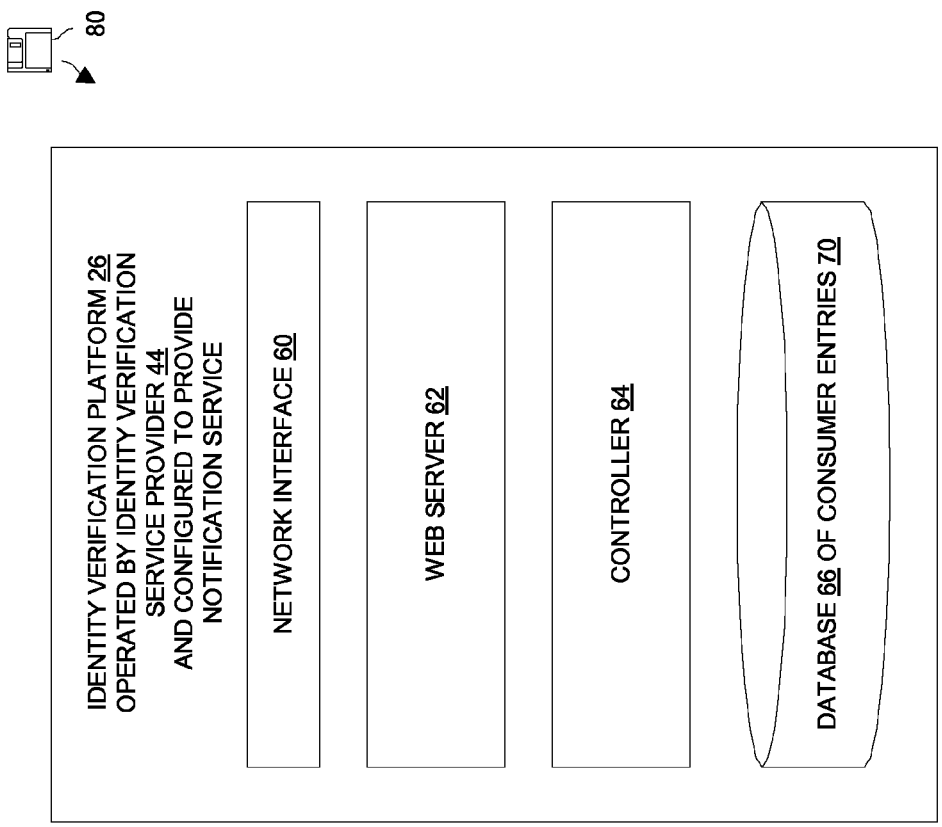
FIG. 2 is a block diagram of an identify verification platform of the electronic system of FIG. 1.

FIG. 2 shows particular details of the identity verification platform 26 which is operated by the identity verification service provider 44. The identity verification platform 26 includes a network interface 60, a web server 62, a controller 64 and a database 66.

The network interface 60 is constructed and arranged to connect the identity verification platform 26 to the communications medium 30. Accordingly, the identity verification platform 26 is able to communicate with the other components of the electronic environment 20 (also see FIG. 1).

The web server 62 is constructed and arranged to work with the institutional entity equipment 22. In particular, when a person at the institutional entity 40 wishes to perform a transaction that involves KBA, a representative of the institutional entity 40 accesses the web server 62 of the identity verification platform 26 to carry out a KBA operation on that person. Along these lines, the representative identifies who the person claims to be (i.e., which consumer 34) via web communications, and the web server 62 then accesses the personal information source 28 for personal information on who the person claims to be and provides the representative with an appropriate set of KBA questions based on that personal information. Next, the web server 62 receives one or more answers to the set of KBA questions from the representative (who may be selecting one or more multiple choice options while communicating directly with the person). The web server 62 then provides the representative with an authentication result base on the one or more answers. The web server 62 is also configured to notify the controller 64 of the completion of such KBA operations.

The controller 64 is constructed and arranged to communicate with the identity theft protection entity equipment 24. In particular, following the KBA operations performed by the web server 62, the controller 64 is configured to immediately inform the identity theft protection entity equipment 24 of the KBA operation. The identity theft protection entity 42 operating that equipment 24 can then contact the consumer 34 to determine whether the KBA operation was legitimate. If it turns out that the consumer 34 was not the person who participated in the authentication operation, the controller 64 is immediately notified by the identity theft protection entity 42 and the controller 64 takes remedial action, e.g., alerts the institutional entity 40.

The database 66 manages and maintains consumer entries 70 regarding consumers 34. Such entries 70 may include certain consumer identifying information such as names, respective postal addresses, dates of birth, social security number data (e.g., hashed last four digits), and so on (e.g., received from the personal information source 28). Additionally, the entries 70 may indicate whether the consumers 34 are subscribers of a particular identity theft protection entity 42 in order to enable the controller 64 to contact that particular identity theft protection entity 42 when attempting to verify recent KBA authentication operations carried out with one or more institutional entities 22.

In some arrangements, the web server 62 and the controller 64 initially populate the database 66 as new consumers 34 are added and then are updated routinely. That is, new customers perform transactions with the institutional entities 40 and thus participate in KBA operations. Additionally, new subscribers subscribe to identity theft protection services offered by the identity theft protection entities 42. Once the consumers 34 are added to the database 66, the web server 62 and the controller 64 may update the database 66 based on communications with the institutional entities 40 and the identity theft protection entities 42, e.g., to record new KBA activity, to add or change subscription information, and so on. Furthermore, the data within the entries 70 of the database 66 may be periodically updated with more current information from the personal information sources 28 as well.

It should be understood that the web server 62 and the controller 64 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 80 is capable of delivering all or portions of the software to the identity verification platform 26. The computer program product 80 has a non-transitory (or non-volatile) computer readable medium which stores a set of instructions which controls one or more operations of the identity verification platform 26. Examples of suitable computer readable storage media include tangible articles of manufacture and apparatus which store instructions in a non-volatile manner such as CD-ROM, flash memory, disk memory, tape memory, and the like. Further details will now be provided with reference to FIG. 3.

Figure 3:
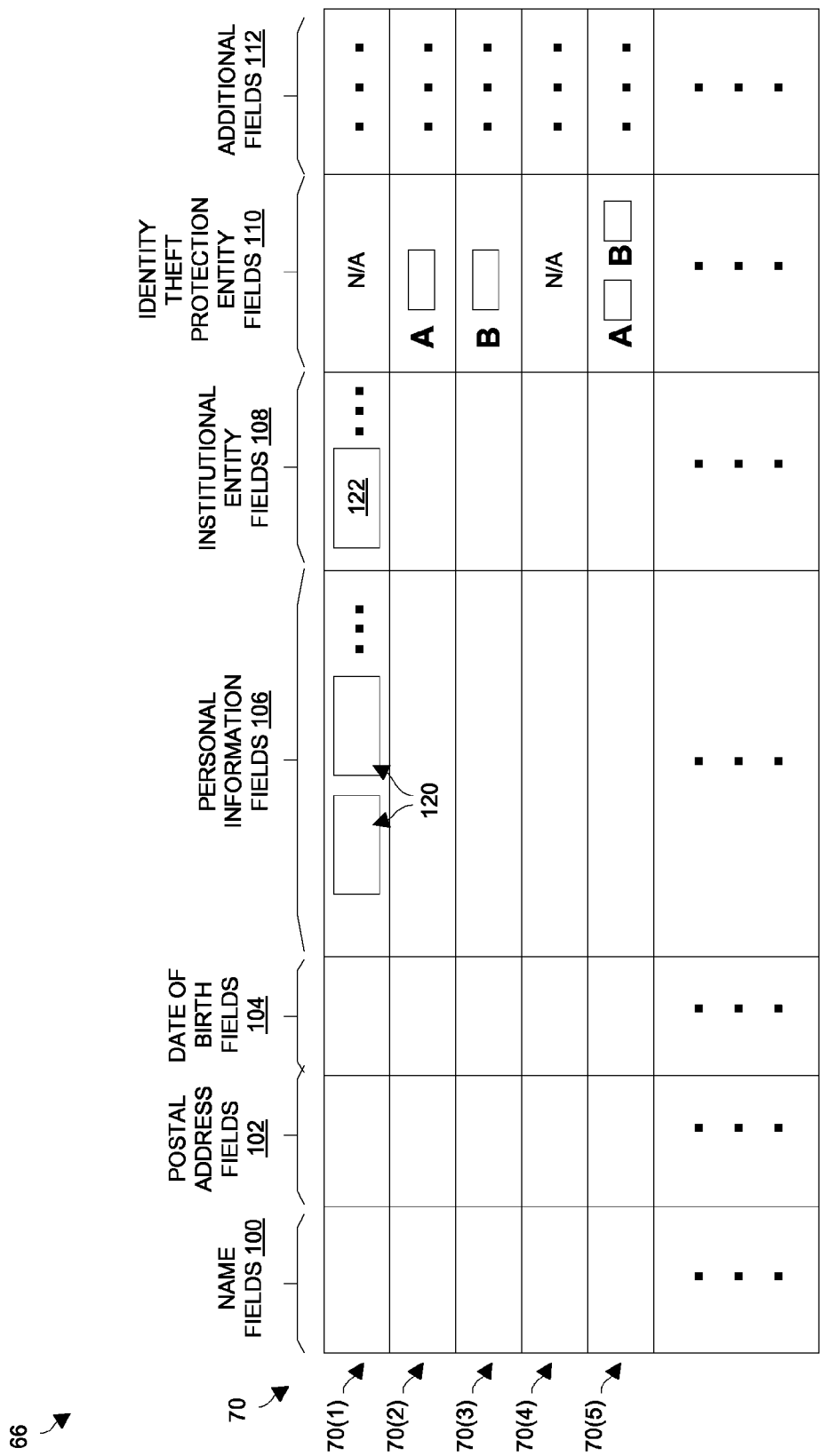
FIG. 3 is a block diagram of particular details of a database of the identify verification platform of FIG. 2.

FIG. 3 shows a general format for the database 66. It should be understood that this format is a logical representation and that the actual data may be stored in a variety of different ways (e.g., as a set of relational databases or tables, as linked lists, in a distributed manner, in separate databases, combinations thereof, etc.).

As shown in FIG. 3, the database 66 includes entries 70(1), 70(2), 70(3), 70(4), 70(5), . . . (collectively, entries 70 shown as rows of a table). Each entry 70 corresponds to a particular consumer 34 (i.e., human) and includes name fields 100, postal address fields 102, date of birth fields 104, personal information fields 106, institutional entity fields 108, identity theft protection entity fields 110, and additional fields 112 (i.e., columns of the table).

For each entry 70, the name fields 100 store a consumer's name (e.g., last name, first name, middle name, etc.). The postal address fields 102 store the consumer's postal address (e.g., street, town/city, state, etc.). The date of birth fields 104 store the consumer's data of birth (e.g., MM/DD/YY).

The personal information fields 106 store various personal information that has been gathered about the consumer 34. Such information may have been obtained from the personal information sources 28 (FIG. 1) and previously used for KBA operations. For example, the contents may indicate where the consumer 34 was married, the color of the consumer's first car, the name of the consumer's first pet, and so on. In this situation, the personal information fields 106 may contain data 120 indicating the particular sources of the personal information and whether each item of data has been used previously for a KBA operation.

The institutional entity fields 108 store histories 122 of prior authentication operations performed by the institutional entities 42 involving the consumer 34. These histories 122 may identify which institutional entities 42 performed authentication operations, the dates of the authentication operations, what questions were provided, what answers were provided, the authentication results, and so on.

The identity theft protection entity fields 110 store data 124 identifying whether the consumer 34 subscribes to the above-described notification service with a particular identity theft protection entity 42. By way of example, the consumers 34 corresponding to entries 70(1) and 70(4) are not subscribers to the notification service. The consumer 34 corresponding to entry 70(2) is a subscriber of the notification service through identity theft protection company "A". Similarly, the consumer 34 corresponding to entry 70(3) is a subscriber of the notification service through identity theft protection company "B". Furthermore, the consumer 34 corresponding to entry 70(5) is a subscriber of both identity theft protection company "A" and identity theft protection company "B" in which the consumer 34 is able to receive notification through both companies.

The additional fields 112 store a variety of miscellaneous data regarding the consumer 34 such as a user identifier (e.g., a searchable index or key), whether the consumer 34 has been marked invalid or marked inactive (e.g., due to detection of fraudulent activity), whether the consumer 34 is related to another consumer 34 or identified under an alias in another entry 70, and so on. Further details regarding the operation of the notification service will now be provided with reference to FIG. 4.

Figure 4:
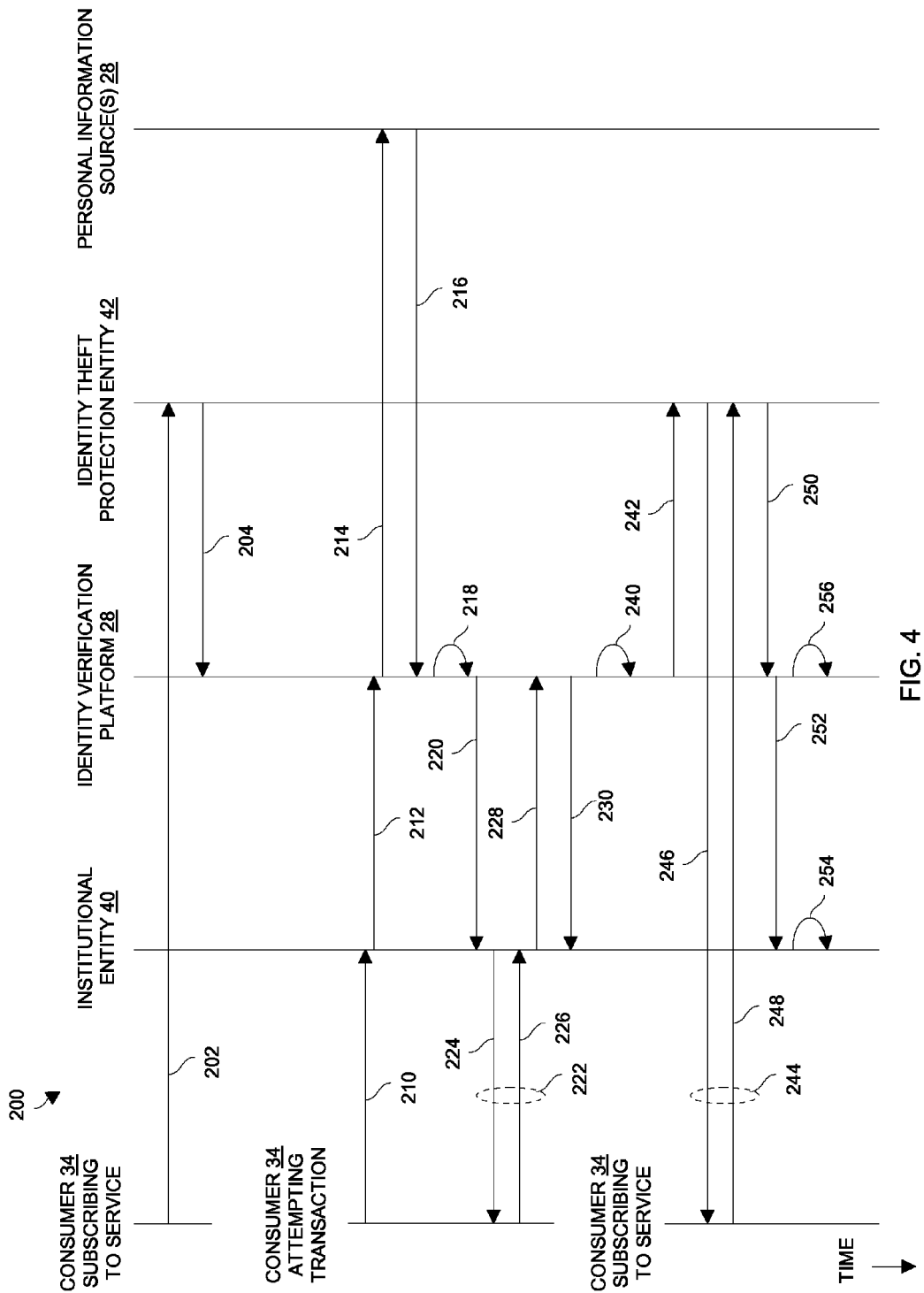
FIG. 4 is a sequence diagram showing various activity of the electronic system of FIG. 1.

FIG. 4 shows a sequence diagram 200 illustrating particular activities involved in providing the above-described notification service. Although time passes in the downward direction, the particular distance in the downward direction does not necessarily indicate any particular amount of time.

Initially, a consumer 34 subscribes for the notification service by dealing with an identity theft protection entity 42 (see arrow 202 in FIG. 4). In some arrangements, the consumer 34 signs up online via a browser session (also see the user device 32 and the identity theft protection entity equipment 24 in FIG. 1). In other arrangements, the consumer 34 signs up over the phone or in person with the identity theft protection entity 42.

Next, the identity theft protection entity 42 informs the identity verification platform 28 that the consumer 34 has become a subscriber of the notification service (see arrow 204). The identity verification platform 28 responds by updating the database 66 (see fields 110 in FIG. 3). At this point, the notification service is in place to protect the consumer 34.

Now, suppose the consumer 34 (or another person posing as the consumer 34) attempts to perform a transaction with the institutional entity 40 (see arrow 210). The transaction may be an in person transaction (e.g., an attempt to open an account), a telephone transaction (e.g., a telephone purchase), an online transaction (e.g., a web browser transaction), and so on. The institutional entity 40 may have an established procedure to perform a KBA operation with the consumer 34 as a precaution against fraud. To this end, the institutional entity 40 communicates with the identity verification platform 28 (see arrow 212). In particular, the institutional entity 40 requests that the identity verification platform 28 provide a KBA service to the institutional entity 40. In some arrangements, the institutional entity 40 obtains this KBA service through a series of web exchanges via the web server 62 (also see FIG. 2).

In response to the request, the identity verification platform 28 searches one or more of the personal information sources 28 (see arrow 214) for personal information regarding the consumer 34 (i.e., who the consumer 34 claims to be). Recall that examples of suitable personal information sources 28 include credit bureaus, credit card companies, and so on. As a result, the identity verification platform 28 obtains such personal information (see arrow 216).

Upon receipt of the personal information, the identity verification platform 28 generates an appropriate set of KBA questions (see arrow 218). The identity verification platform 28 provides the set of KBA questions to the institutional entity 40 (see arrow 220).

At this point, the institutional entity 40 conducts an exchange 222 with the person claiming to be the consumer 34. In particular, a representative of the institutional entity 40 asks one or more of the KBA questions (arrow 224) and receives an answer to each asked KBA question (arrow 226) from that person such as by reading from a web page and clicking multiple choice answers on the web page. The representative then sends the answered web page back to identity verification platform 28 for evaluation (arrow 228). Upon receipt, the identity verification platform 28 analyzes the answered web page and returns an authentication result (arrow 230). In some arrangements, such evaluation involves a simple matching of provided answers to expected answers. In other arrangements, such evaluation may involve generation of a risk score (i.e., a quantitative measurement of risk) and a comparison of the risk score to a predefined threshold to determine whether authentication is successful.

As soon as this KBA session is completed with the institutional entity 40, the identity verification platform 28 performs a back-end procedure (arrow 240). In particular, the controller 64 of the identity verification platform 28 updates an entry 70 of the database 66 corresponding to the consumer 34 with the history of the KBA session and checks the entry 70 to determine whether the consumer 34 subscribes to the notification service (e.g., see the field 110 in FIG. 3).

Since the consumer 34 does subscribe to the notification service (i.e., arrows 202, 204 in FIG. 4), the identity verification platform 28 sends a query to the actual consumer 34 subscribing to the notification service. In particular, the query is carried out indirectly through the identity theft protection entity 42. Along these lines, the identity verification platform 28 sends a notification message to the identity theft protection entity 42 (arrow 242). The notification message indicates that the consumer 34 recently participated in an authentication operation and asks the identity theft protection entity 42 to confirm this fact with the actual consumer 34 who subscribes to the notification service. In response, the identity theft protection entity 42 carries out an exchange 244 with the consumer 34. In particular, the identity theft protection entity 42 informs the consumer 34 that it has discovered that an authentication operation was recently performed with someone claiming to be the consumer 34 and prompting the consumer 34 to indicate whether consumer 34 in fact participated (arrow 246). The consumer 34 then provides a response answering the query (arrow 248).

Conveying the response may involve operation of the user device 32 operated by the consumer 34 (also see FIG. 1). For example, in some arrangements, the consumer 34 is queried via an email message leading with a link to a web page (e.g., the consumer 34 clicks on a link and then hits a web page button to answer the query). In other arrangements, consumer 34 receives an SMS message and answers the SMS message. In other arrangements, the consumer 34 receives a telephone call from a representative of the identity theft protection entity 42 and provides a verbal answer which is conveyed back to the identity verification platform 28.

At this point, it should be understood that if the consumer 34 did in fact participate in the authentication operation with the institutional entity 40, the consumer 34 provides a positive answer which simply confirms the legitimacy of the transaction. Accordingly, the consumer 34 is content in that his subscription to the notification service is working properly and his identity has been safeguarded by the notification service.

Alternatively, suppose that the consumer 34 did not participate in the authentication operation with the institutional entity 40. In this situation, the query serves as a notice that the consumer's identity may have been taken by a fraudster. Even so, the negative answer from the consumer 34 in response to the query immediately informs the identity theft protection entity 42 that the authentication operation was fraudulent (i.e., the arrow 248). Moreover, in response, the identity theft protection entity 42 immediately notifies the identity verification platform 28 (arrow 250) which, in turn, notifies the institutional entity 40 (arrow 252).

With the institutional entity 40 having been alerted and without very much time having passed, the institutional entity 40 is able to take remedial action (arrow 254). For example, a banking institution may be able to prevent processing of a banking transaction or be able to recall the transaction within a limited time window. As another example, a credit card company may wait for the message (arrow 252) before issuing credit or activating a credit card, and so on.

Likewise, the identity verification platform 28 is able to take remedial action as well (arrow 256). For example, the identity verification platform 28 may update the database 66 to indicate that a fraudster may be attempting to pose as the consumer 34. Additionally, the identity verification platform 28 may notify other institutional entities 40 (e.g., credit card companies, stores, banking institutions, etc.) of the fraudster thus enabling the other institutional entities 40 to beware of future transactions attempted by the fraudster (i.e., warning to a federation of institutional entities 40). Further details will now be provided with reference to FIG. 5.

Figure 5:
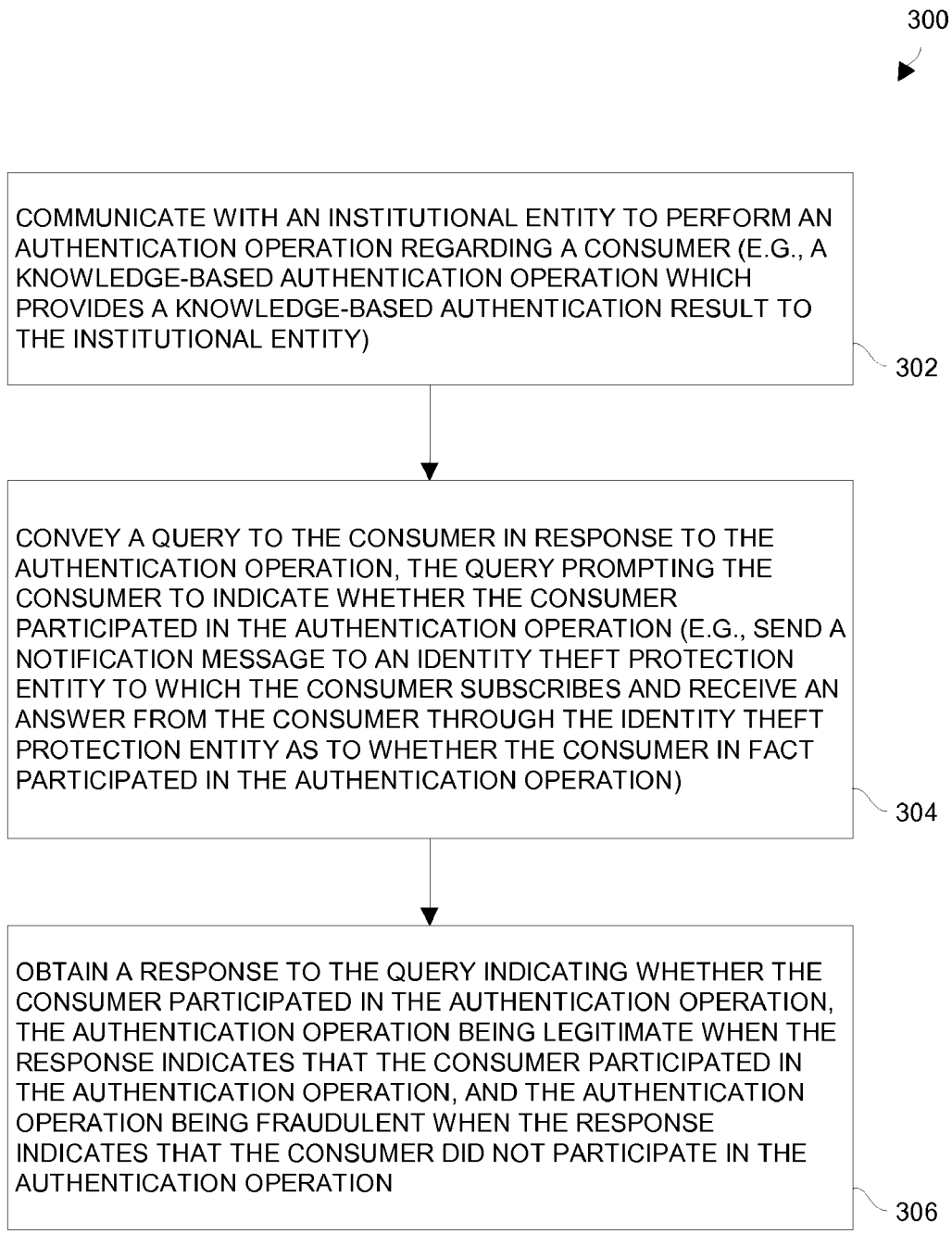
FIG. 5 is a flowchart of a procedure which is performed by the identify verification platform of FIG. 2.

FIG. 5 is a flowchart of a procedure 300 which is performed by the identify verification platform 28 when managing consumer authentication. Prior to step 302, it is assumed that the actual consumer 34 has subscribed to the notification service via the identity theft protection entity 42 which in turn updated the identify verification platform 28.

In step 302, the identify verification platform 28 communicates with an institutional entity 40 to perform an authentication operation regarding the consumer 34. Such communication may occur when a representative of the institutional entity 40 conducts a KBA session with someone claiming to be the consumer 34 (also see arrows 210 through 230 in FIG. 4). The representative may conduct the KBA session while concurrently walking through a web session with the web server 62 of the identify verification platform 28 to obtain KBA questions, provide KBA answers, and obtain a KBA result.

In step 304, the identify verification platform 28 conveys a query to the consumer 34 in response to the authentication operation. The query prompts the consumer 34 to indicate whether the consumer 34 participated in the authentication operation.

In step 306, the identify verification platform 28 obtaining a response to the query indicating whether the consumer 34 participated in the authentication operation. The authentication operation is legitimate when the response indicates that the consumer 34 participated in the authentication operation. However, the authentication operation is fraudulent when the response indicates that the consumer 34 did not participate in the authentication operation.

In some arrangements, for steps 304 and 306, the identify verification platform 28 sends a notification message to an identity theft protection entity 42 to which the consumer 34 subscribes and that entity 42 obtains and returns an answer to the query. That is, the consumer 34 receives the notification service through the identity theft protection entity 42 as part of the consumer's subscription.

As described above, an improved technique is directed to a notification service which involves contacting a consumer 34 as soon as a KBA service provider has communicated with an institutional entity 40 to perform an authentication operation regarding the consumer 34 (e.g., to open a credit card account, to open a line of credit at a store, etc.). Once the consumer 34 is contacted, the consumer 34 can confirm that the consumer 34 did in fact participate in the authentication operation. Moreover, once the consumer 34 is contacted, if the consumer 34 indicates that the consumer 34 did not participate in the authentication operation, the consumer 34 now knows that the consumer's identity has been stolen and appropriate steps can be taken to protect the consumer 34 before more time passes.

While various embodiments of the invention have been particularly shown and described, it will be understood by those skilled in the art that various changes in form and details may be made therein without departing from the spirit and scope of the invention as defined by the appended claims.

For example, the identify verification platform 28 was described above as including a web server 62 to facilitate KBA with institutional entities 40. In other arrangements, the identify verification platform 28 provides KBA session via other means (e.g., remote login sessions, via a specialized graphical user interface, via telephone, combinations thereof, and so on).

Additionally, the identify verification platform 28 was described above as accessing the personal information source 28 prior to generating a set of KBA questions. It should be understood that, in some arrangements, the identify verification platform 28 already has access to personal information (e.g., stored within the database 66) thus alleviating the need to always access the personal information source 28.

Furthermore, although the identify verification platform 28 was described above as including different circuits to handle KBA and consumer notification, in other arrangements, the circuitry responsible for knowledge-based authentication is more tightly integrated with (e.g., implemented as part of the controller 64) the circuitry that notifies the identity theft protection entity 42 and receives answers from the identity theft protection entity 42.

In yet other arrangements, the different circuits are further separated (e.g., reside in different devices). Such arrangements may provide certain advantages in connection with support, scalability, security, and so on. Such modifications and enhancements are intended to belong to various embodiments of the invention.

What is claimed is:

1. A method of managing consumer authentication, the method comprising:
by an identity verification platform, communicating with an institutional entity to perform an authentication operation regarding a consumer;
conveying, by the identity verification platform, a query to the consumer in response to completion of the authentication operation, the query prompting the consumer to indicate whether the consumer participated in the authentication operation;
obtaining, by the identity verification platform, a response to the query indicating whether the consumer participated in the authentication operation, the authentication operation being legitimate when the response indicates that the consumer participated in the authentication operation, and the authentication operation being fraudulent when the response indicates that the consumer did not participate in the authentication operation;
receiving, by the identity verification platform, a plurality of subscription messages, each one of the plurality of subscription messages received from a different respective one of a plurality of identity protection entities, each of the subscription messages indicating that at least one consumer subscribes to a notification service provided by a different one of the plurality of identity protection entities;
updating, by the identity verification platform, a database of consumer entries to indicate that at least one consumer subscribes to each of the plurality of notification services provided by the plurality of identity protection entities;
wherein conveying the query to the consumer by the identity verification platform in response to completion of the authentication operation includes:
determining whether the consumer subscribes to a notification service by determining whether a database entry for the consumer in the database of consumer entries contained in the identity verification platform includes at least one indication of an identity protection entity through which the consumer subscribes to a notification service; and
in response to determining that the database entry for the consumer includes at least one indication of an identity protection entity through which the consumer subscribes to a notification service, directing the identity protection entity indicated by the database entry for the consumer to ask the consumer whether the consumer recently authenticated with the institutional entity, the identity protection entity asking the consumer on behalf of the identity verification platform, the identity verification platform being (i) different than the institutional entity and (ii) different than the identity protection entity.

2. A method as in claim 1 wherein conveying the query to the consumer in response to completion of the authentication operation further includes:
sending a notification message to the identity protection entity indicated by the database entry for the consumer, which is different than the institutional entity and the identity verification platform, the notification message directing the identity protection entity indicated by the database entry for the consumer to confirm that the consumer participated in the authentication operation.

3. A method as in claim 2 wherein obtaining the response to the query includes:
receiving, as the response to the query, a reply message from the identity protection entity, the reply message (i) indicating whether the consumer participated in the authentication operation and (ii) being based on direct communication between the consumer and the identity protection entity.

4. A method as in claim 3, further comprising:
providing an alert to the institutional entity in response to the reply message indicating that the consumer did not participate in the authentication operation.

5. A method as in claim 1 wherein communicating with the institutional entity to perform the authentication operation regarding the consumer includes:
accessing, from the database entry for the consumer, (i) a consumer identifier identifying the consumer and (ii) knowledge-based authentication (KBA) information describing the consumer, and
based on the KBA information describing the consumer, providing the institutional entity with a set of KBA questions for use in the authentication operation.

6. A method as in claim 5, further comprising:
prior to communicating with the institutional entity to perform the authentication operation regarding the consumer, (i) receiving a subscription message from the identity protection entity, the subscription message indicating that the consumer subscribes to the notification service provided by the identity protection entity and (ii) updating the database of consumer entries to indicate that the consumer subscribes to the notification service provided by the identity protection entity by storing the indication of the identity protection entity into the database entry for the consumer.

7. A method as in claim 6, further comprising:
prior to conveying the query to the consumer in response to the authentication operation, reading a contents of an identity theft protection entity field of the database entry for the consumer to determine whether the consumer subscribes to any notification service, wherein an empty identity theft protection entity field in the database entry for the consumer indicates that the consumer does not subscribe to a notification service, and wherein a non-empty identity theft protection entity field in the database entry for the consumer indicates that the consumer subscribes to at least one notification service.

8. A method as in claim 1, further comprising:
wherein the entries in the database of consumer entries contained in the identity verification platform further include (i) consumer identifiers identifying respective consumers, and (ii) knowledge-based authentication (KBA) information describing the respective consumers, and wherein the database entry for the consumer further includes a particular consumer identifier which identifies the consumer and particular KBA information describing the consumer.

9. A method as in claim 8, further comprising:
from the database of consumer entries, accessing the KBA information describing the respective consumers, and
providing sets of KBA questions based on the KBA information to multiple institutional entities for use in authentication operations.

10. A method as in claim 9 further comprising:
sending notification messages to multiple identity protection entities to query various consumers on whether the various consumers participated in the authentication operations.

11. An identity verification platform, comprising:
a network interface for connecting to a network;
a web server coupled to the network interface, the web server being constructed and arranged to communicate with an institutional entity to perform an authentication operation regarding a consumer; and
a controller coupled to the network interface, the controller being constructed and arranged to:
convey a query to the consumer in response to completion of the authentication operation, the query prompting the consumer to indicate whether the consumer participated in the authentication operation, and
obtain a response to the query indicating whether the consumer participated in the authentication operation, the authentication operation being legitimate when the response indicates that the consumer participated in the authentication operation, and the authentication operation being fraudulent when the response indicates that the consumer did not participate in the authentication operation,
receive a plurality of subscription messages, each one of the plurality of subscription messages received from a different respective one of a plurality of identity protection entities, each of the subscription messages indicating that at least one consumer subscribes to a notification service provided by a different one of the plurality of identity protection entities, and
update a database of consumer entries to indicate that at least one consumer subscribes to each of the plurality of notification services provided by the plurality of identity protection entities;
wherein the controller, when conveying the query to the consumer in response to the authentication operation, is constructed and arranged to:
determine whether the consumer subscribes to a notification service by determining whether a database entry for the consumer in the database of consumer entries contained in the identity verification platform includes at least one indication of an identity protection entity through which the consumer subscribes to a notification service; and
in response to determining that the database entry for the consumer includes at least one indication of an identity protection entity through which the consumer subscribes to a notification service, direct the identity protection entity indicated by the database entry for the consumer to ask the consumer whether the consumer recently authenticated with the institutional entity, the identity protection entity asking the consumer on behalf of the identity verification platform, the identity verification platform being (i) different than the institutional entity and (ii) different than the identity protection entity.

12. An identity verification platform as in claim 11 wherein the controller, when conveying the query to the consumer in response to completion of the authentication operation, is constructed and arranged to:
send a notification message to the identity protection entity indicated by the database entry for the consumer, which is different than the institutional entity and the identity verification platform, the notification message directing the identity protection entity indicated by the database entry for the consumer to confirm that the consumer participated in the authentication operation.

13. An identity verification platform as in claim 11 wherein the web server, when communicating with the institutional entity to perform the authentication operation regarding the consumer, is constructed and arranged to:
access, from the database entry for the consumer, (i) a consumer identifier identifying the consumer and (ii) knowledge-based authentication (KBA) information describing the consumer, and
based on the KBA information describing the consumer, provide the institutional entity with a set of KBA questions for use in the authentication operation.

14. An identity verification platform as in claim 11, further comprising:
wherein the entries in the database of consumer entries contained in the identity verification platform include (i) consumer identifiers identifying respective consumers, and (ii) knowledge-based authentication (KBA) information describing the respective consumers, and wherein the database entry for the consumer further includes a particular consumer identifier which identifies the consumer and particular KBA information describing the consumer.

15. A computer program product which includes a non-transitory computer readable medium storing a set of instructions to manage consumer authentication; the set of instructions, when carried out by a computer, causing the computer to perform a method comprising:
by an identity verification platform, communicating with an institutional entity to perform an authentication operation regarding a consumer,
conveying, by the identity verification platform, a query to the consumer in response to completion of the authentication operation, the query prompting the consumer to indicate whether the consumer participated in the authentication operation,
obtaining, by the identity verification platform, a response to the query indicating whether the consumer participated in the authentication operation, the authentication operation being legitimate when the response indicates that the consumer participated in the authentication operation, and the authentication operation being fraudulent when the response indicates that the consumer did not participate in the authentication operation,
receiving, by the identity verification platform, a plurality of subscription messages, each one of the plurality of subscription messages received from a different respective one of a plurality of identity protection entities, each of the subscription messages indicating that at least one consumer subscribes to a notification service provided by a different one of the plurality of identity protection entities, and
updating, by the identity verification platform, a database of consumer entries to indicate that at least one consumer subscribes to each of the plurality of notification services provided by the plurality of identity protection entities;

wherein conveying the query to the consumer by the identity verification platform in response to completion of the authentication operation includes:

determining whether the consumer subscribes to a notification service by determining whether a database entry for the consumer in the database of consumer entries contained in the identity verification platform includes at least one indication of an identity protection entity through which the consumer subscribes to a notification service; and in response to determining that the database entry for the consumer includes at least one indication of an identity protection entity through which the consumer subscribes to a notification service, directing the identity protection entity indicated by the database entry for the consumer to ask the consumer whether the consumer recently authenticated with the institutional entity, the identity protection entity asking the consumer on behalf of the identity verification platform, the identity verification platform being (i) different than the institutional entity and (ii) different than the identity protection entity.

16. A computer program product as in claim 15 wherein conveying the query to the consumer in response to completion of the authentication operation includes:

sending a notification message to the identity protection entity indicated by the database entry for the consumer, which is different than the institutional entity and the identity verification platform, the notification message directing the identity protection entity indicated by the database entry for the consumer to confirm that the consumer participated in the authentication operation.

17. A computer program product as in claim 15 wherein communicating with the institutional entity to perform the authentication operation regarding the consumer includes:

accessing, from the database entry for the consumer, (i) a consumer identifier identifying the consumer and (ii) knowledge-based authentication (KBA) information describing the consumer, and based on the KBA information describing the consumer, providing the institutional entity with a set of KBA questions for use in the authentication operation.

18. A computer program product as in claim 15, further comprising:

wherein the entries in the database of consumer entries contained in the identity verification platform further include (i) consumer identifiers identifying respective consumers, and (ii) knowledge-based authentication (KBA) information describing the respective consumers, and wherein the database entry for the consumer further includes a particular consumer entry having a particular consumer identifier which identifies the consumer and particular KBA information describing the consumer.

19. An electronic system, comprising:
institutional entity equipment;
identity protection entity equipment; and
an identity verification logic platform to manage consumer authentication, the identity verification logic platform being constructed and arranged to:
    communicate with the institutional entity to perform an authentication operation regarding a consumer,
    convey, to the identity protection entity equipment, a query to the consumer in response to completion of the authentication operation, the query prompting the consumer to indicate whether the consumer participated in the authentication operation,
    obtain a response to the query indicating whether the consumer participated in the authentication operation, the authentication operation being legitimate when the response indicates that the consumer participated in the authentication operation, and the authentication operation being fraudulent when the response indicates that the consumer did not participate in the authentication operation,
    receive a plurality of subscription messages, each one of the plurality of subscription messages received from a different respective one of a plurality of identity protection entities, each of the subscription messages indicating that at least one consumer subscribes to a notification service provided by a different one of the plurality of identity protection entities, and update a database of consumer entries to indicate that at least one consumer subscribes to each of the plurality of notification services provided by the plurality of identity protection entities;

wherein the identification verification logic platform, when conveying the query to the consumer in response to the authentication operation, is constructed and arranged to:

determine whether the consumer subscribes to a notification service by determining whether a database entry for the consumer in the database of consumer entries contained in the identity verification logic platform includes at least one indication of an identity protection entity through which the consumer subscribes to a notification service; and in response to determining that the database entry for the consumer includes at least one indication of an identity protection entity through which the consumer subscribes to a notification service, direct the identity protection entity equipment indicated by the database entry for the consumer to ask the consumer whether the consumer recently authenticated with the institutional entity equipment, the identity protection entity equipment asking the consumer on behalf of the identity verification logic platform, the identity verification logic platform being (i) different than the institutional entity equipment and (ii) different than the identity protection entity equipment.

20. An electronic system as in claim 19, further comprising wherein the entries in the database of consumer entries contained in the identity verification logic platform further maintain a database of include (i) consumer identifiers identifying respective consumers, and (ii) knowledge-based authentication (KBA) information describing the respective consumers, and wherein the database entry for the consumer further includes the database of a particular consumer identifier which identifies the consumer and particular KBA information describing the consumer.

21. An identity verification platform as in claim 11 wherein the query is conveyed to the consumer in a manner which circumvents the institutional entity; and wherein the identity protection entity is directed to ask the consumer whether the consumer recently authenticated with the institutional entity via a knowledge-based authentication session.

22. A method as in claim 1, further comprising:
extracting, from the response to the query, an electronic consumer answer which indicates whether the consumer participated in the authentication operation; and selecting one of multiple security-related actions based on the electronic consumer answer.

23. A method as in claim 22 wherein extracting the electronic consumer answer from the response to the query includes:
 acquiring a positive consumer answer, the positive consumer answer indicating that the consumer did in fact participate in the authentication operation with the institutional entity, the positive consumer answer serving to confirm legitimacy of a transaction involving the consumer and the institutional entity.

24. A method as in claim 23 wherein conveying the query to the consumer in response to the authentication operation includes:
 electronically sending a query message, by the identity protection entity indicated by the database entry for the consumer, to the consumer in response to successful authentication during a knowledge-based authentication session involving the institutional entity, the query message asking the consumer whether the consumer successfully authenticated during the knowledge-based authentication session.

25. A method as in claim 6, wherein the identity protection entity comprises an identity theft protection company, and wherein updating the database of consumer entries to indicate that the consumer subscribes to the notification service provided by the identity protection entity includes:
 updating the contents of an identity protection entity field in the particular consumer entry to store data identifying the identity theft protection company.

26. A method as in claim 6, further comprising:
 wherein updating the database of consumer entries to indicate that the consumer subscribes to the notification service provided by the identity protection entity includes:
  updating the contents of an identity protection entity field in the particular consumer entry to store data identifying multiple identity protection entities, each of the multiple identity protection entities comprising a separate identity theft protection company; and
 wherein conveying the query to the consumer in response to completion of the authentication operation and to the indication that the consumer subscribes to the notification service provided by the identity protection entity includes:
  sending a notification message to each of the multiple identity theft protection companies.

27. A method as in claim 1, wherein each entry in the database of consumer entries includes:
 a name field storing a name of a consumer associated with the entry;
 a personal information field storing knowledge based authentication (KBA) information describing the consumer associated with the entry, and indications of whether each item of data within the KBA information has been used previously for an authentication operation regarding the consumer associated with the entry;
 an institutional entity field storing histories of prior authentication operations by institutional entities with regard to the consumer associated with the entry, the histories of prior authentication operations including dates of the authentication operations, questions submitted during the authentication operations, answers provided to the questions submitted, and the results of the prior authentication operations; and
 an identity theft protection entity field storing indications of one or more identity protection entities through which the consumer associated with the entry subscribes to one or more notification services.

* * * * *